US 6,551,387 B2

(12) United States Patent
Abe et al.

(10) Patent No.: US 6,551,387 B2
(45) Date of Patent: Apr. 22, 2003

(54) GAS SEPARATION APPARATUS

(75) Inventors: Tetsuya Abe, Ibaraki-ken (JP);
Sadamitsu Tanzawa, Ibaraki-ken (JP);
Seiji Hiroki, Ibaraki-ken (JP);
Yoshinori Tajima, Tokyo (JP); Takashi Futatsuki, Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 09/915,915

(22) Filed: Jul. 26, 2001

(65) Prior Publication Data

US 2002/0023540 A1 Feb. 28, 2002

(30) Foreign Application Priority Data

Jul. 26, 2000 (JP) ........................................ 2000-225881

(51) Int. Cl.[7] ................................................ B01D 53/02
(52) U.S. Cl. ................................ 96/104; 96/4; 96/134; 62/617
(58) Field of Search ............................ 96/4, 101, 104, 96/108, 134, 136; 95/45, 82, 86, 131; 62/617; 423/240 S

(56) References Cited

U.S. PATENT DOCUMENTS

| | | | |
|---|---|---|---|
| 3,373,872 A | * | 3/1968 | Hrdina |
| 3,514,262 A | * | 5/1970 | Ayes et al. ................... 436/55 |
| 3,960,520 A | * | 6/1976 | Allen |
| 4,444,572 A | * | 4/1984 | Avon et al. ................... 95/97 |
| 5,069,690 A | | 12/1991 | Henderson et al. |
| 5,759,237 A | * | 6/1998 | Li et al. ...................... 95/128 |
| 5,785,741 A | * | 7/1998 | Li et al. ...................... 96/134 |
| 5,976,222 A | * | 11/1999 | Yang et al. ................... 95/131 |
| 6,030,591 A | * | 2/2000 | Tom et al. ................... 423/210 |
| 6,187,077 B1 | * | 2/2001 | Li ............................... 95/131 |
| 6,257,018 B1 | * | 7/2001 | Kelly et al. ................... 62/617 |
| 6,277,173 B1 | * | 8/2001 | Sadakata et al. ............. 95/12 |

FOREIGN PATENT DOCUMENTS

| | | |
|---|---|---|
| DE | 198 37 845 A1 | 2/2000 |
| EP | 0 500 040 A1 | 8/1992 |
| EP | 0 754 487 A1 | 1/1997 |
| JP | 362129272 A * | 6/1987 |

OTHER PUBLICATIONS

U.S. patent application Publication 2002/0011153 A1, Abe et al., figures and claims, published Jan. 31, 2002.*
P.E. Barker et al., Separation of Organic Mixtures by Sequential Gas–Liquid Chromatography, The Canadian Journal of Chemical Engineering, vol. 57, pp. 44–45, Feb., 1979.*
European Search Report dated Nov. 23, 2001, 3 pages.

* cited by examiner

Primary Examiner—David A. Simmons
Assistant Examiner—Frank M. Lawrence
(74) Attorney, Agent, or Firm—Rosenthal & Osha L.L.P.

(57) ABSTRACT

A discharge gas containing PFC gas including $CF_4$ and $NF_3$ generated from a manufacturing process (10) is adsorbed at an adsorbing device (18) and then desorbed using nitrogen as a purge gas. A desorbed gas with $CF_4$ and $NF_3$ concentrated can be obtained in this manner. The desorbed gas is then supplied to a chromatographic separator (20) for chromatographic separation with nitrogen as a carrier gas. In this manner, $CF_4$ and $NF_3$ within the PFC gas can be separated. In particular, because the gas is once concentrated at the adsorbing device (18), chromatographic separation of the gas constituents can be efficiently performed. By independently concentrating $CF_4$ and $NF_3$ obtained by the chromatographic separation, high purity gas constituents of the PFC gas can be obtained, and reused at the manufacturing process (10).

11 Claims, 3 Drawing Sheets

GAS SEPARATION APPARATUS

BACKGROUND OF THE INVENTION

1. Field of the Invention

The present invention relates to a gas separation apparatus for separating specific gases from a mixture gas containing a plurality of gases.

2. Description of the Related Art

Conventionally, various gases are used in semiconductor manufacturing processes depending on the process. For example, perfluoro compound (PFC) gas which is a mixture containing fluorine compounds such as $CF_4$, $NF_3$, $C_2F_6$, $C_3F_8$, $SF_6$, and $CHF_3$ is used as a reaction gas at the dry etching process or at the thin film forming process. In these processes, discharge gas is produced which contains the PFC gas.

Because these discharge gases such as PFC cannot be discharged out of the manufacturing line as such, various methods are employed for treating these gases. The treating methods include (i) decomposition in which the PFC gas is decomposed by combustion, catalyst heating, or plasma decomposition; (ii) membrane separation in which these materials are separated by a membrane; and (iii) subzero cooling separation in which the separation is achieved taking advantage of the difference in the boiling points of the gases.

However, in the decomposition method (i), there are shortcomings in that a complete decomposition is difficult and the gas cannot be recovered for reuse because the gas is decomposed and discharged. In the membrane separation (ii), although nitrogen in the discharge gas can be removed, the separation between $CF_4$ and $NF_3$ or the like which have similar molecular size is difficult. In the above method (iii), the overall size of the apparatus becomes large, resulting in increased cost for the equipment and increased running cost. Moreover, because the boiling point difference between $CF_4$ and $NF_3$ is only 1° C., the separation is difficult.

SUMMARY OF THE INVENTION

One object of the present invention is to provide a gas separation apparatus capable of separating a mixture gas having a plurality of gas constituents inexpensively and with high purity.

In order to achieve the object mentioned above, according to one aspect of the present invention, there is provided a gas separation apparatus for separating specific gases from a mixture gas to be treated containing the specific gases, the apparatus comprising: an adsorbing device for adsorbing the specific gases within the mixture gas to be treated by supplying the mixture gas to be treated and for desorbing the adsorbed specific gases by supplying a purge gas; and a separator for separating chromatographically the mixture gas containing the specific gases from the adsorbing device, into each of the plurality of gas constituents.

In this manner, by using a separator which performs chromatographic separation, separation of specific gases, such as, for example, $CF_4$ and $NF_3$, contained in the mixture gas to be treated, which are otherwise difficult to be separated, can be reliably achieved. The separated $CF_4$ and $NF_3$ can then be recovered and reused.

An adsorbing device is provided before the separator, in which device the specific gases are adsorbed and then desorbed by a purge gas. By adsorbing and then desorbing, the specific gases can be concentrated. In this manner, the specific gases, such as, for example, $CF_4$ and $NF_3$ can be reliably separated at the separator.

According to another aspect of the present invention, it is preferable that concentration means is further provided for independently concentrating the gas separated into each of the plurality of gas constituents and obtained at the chromatographic separator, and the concentrated gas obtained by the concentration means is recovered and reused.

A carrier gas (for example, nitrogen) is included in the specific gases separated chromatographically, such as, for example, $CF_4$ and $NF_3$. By removing the carrier gas by the concentration means, each of the specific gases can be recovered and reused.

According to another aspect of the present invention, it is preferable that a mixture gas containing the specific gases having a plurality of gas constituents is the PFC gas discharged from a semiconductor manufacturing process and the mixture gas to be treated contains nitrogen as another gas.

When the specific gases constitute the PFC gas, activated carbon or silica gel, or the like can be preferably used as the adsorbent. Also, for desorption, it is preferable to use nitrogen gas as the purge gas under an overheated condition.

According to another aspect of the present invention, it is preferable that the PFC gas contains one of fluorine compounds having at least one of the elements C, N, and S as a composition element.

According to another aspect of the present invention, it is preferable that the PFC gas includes one of $CF_4$, $NF_3$, $C_2F_6$, $C_3F_8$, $SF_6$, or $CHF_3$.

According to another aspect of the present invention, it is preferable that the above-mentioned concentration means is either a membrane separator which takes advantage of the permeability/impermeability of a membrane or a subzero cooling separator which takes advantage of difference in boiling points. With such a concentration means, concentration of the PFC gas, for example, can be effectively performed.

According to another aspect of the present invention, it is preferable that a plurality of chromatographic columns are provided and used in sequence. By using a plurality of columns, the separation process can be performed almost continuously.

According to another aspect of the present invention, it is preferable that the gases other than the specific gases separated at the separator contains nitrogen as the main constituent and the nitrogen gas is reused for a given usage.

According to another aspect of the present invention, it is preferable to perform a process to remove gas constituents other than the nitrogen gas on the gas containing nitrogen gas as its main constituent.

DESCRIPTION OF PREFERRED EMBODIMENT

Figure 1:
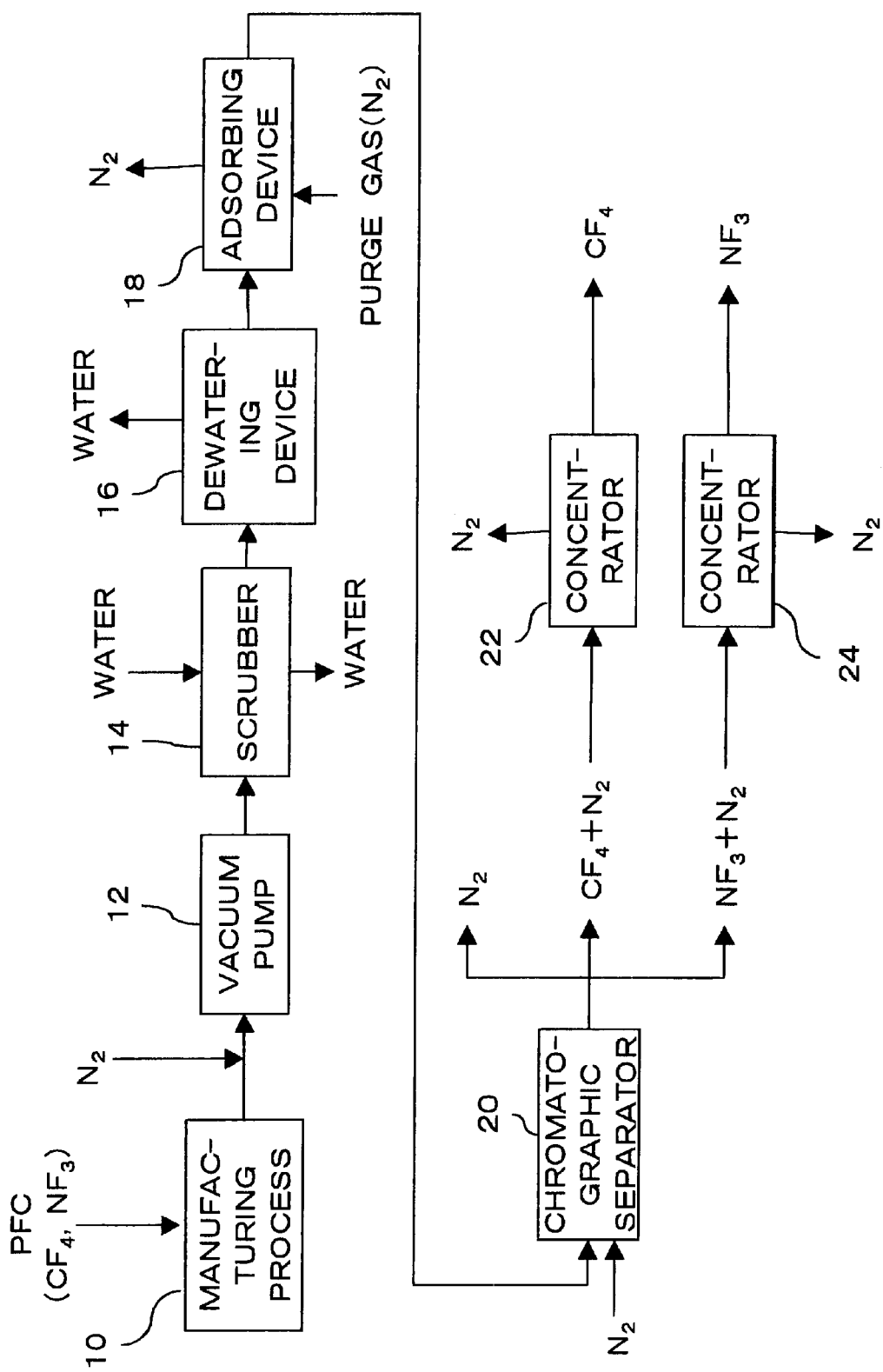
FIG. 1 is a diagram showing a schema of one of embodiments of the present invention.

A preferred embodiment of the present invention will now be described referring to the drawings.

A PFC gas is supplied in a manufacturing process 10 such as etching or thin film formation at a semiconductor manufacturing plant. A discharge gas containing the PFC gas is thus produced. The inlet side of a vacuum pump 12 is connected to the path for the discharge gas and the discharge gas containing PFC gas is discharged from the manufacturing process 10 by the vacuum pump 12. As the PFC gas, $CF_4$, $NF_3$, $C_2F_4$, $SF_6$, or the like or a combination thereof are suitably used. In the embodiment, the PFC gas contains $CF_4$ and $NF_3$. Here, because the PFC gas decomposes in the manufacturing process 10 to generate hydrofluoric acid, the discharge gas also contains hydrofluoric acid. Because of this, if the discharge gas is directly introduced into the vacuum pump 12, the vacuum pump 12 may be damaged. In order to handle this problem, nitrogen gas is supplied as a diluting gas, from the discharge gas path to the vacuum pump 12, to dilute the discharge gas.

The outlet side of the vacuum pump 12 is connected to a scrubber 14. The discharge gas which is diluted by nitrogen is supplied to the scrubber 14. The scrubber 14 employs a water shower to dissolve and absorb hydrofluoric acid (HF) within the discharge gas into water.

The discharge gas from the scrubber 14 is then introduced to a dewatering device 16, where water is removed. The discharge gas from the scrubber 14 contains a large amount of water and it is desirable to remove water for the subsequent processes. Any form of dewatering device can be used as the dewatering device 16, but it is preferable to employ a dewatering device in which water is removed by reducing the temperature of the discharge gas.

The discharge gas containing PFC gas and nitrogen thus obtained is supplied to an adsorbing device 18. The adsorbing device 18 is constructed from a column filled with an adsorbent for adsorbing the PFC gas. As the adsorbent, any one of various hydrophobic adsorbents can be used, such, for example, as activated carbon and hydrophobic silica gel (calcined material). By flowing the discharge gas through the adsorbing device 18, the PFC gas is adsorbed and nitrogen is discharged.

After a predetermined amount of PFC gas is adsorbed, the PFC gas adsorbing capability of the adsorbent will reach its limit. At this stage, the supply of discharge gas is stopped, the temperature of the column is raised, and nitrogen is supplied as the purge gas, in order to desorb the adsorbed PFC gas into the purge gas. It is preferable to provide a plurality of columns filled with the adsorbent as the adsorbing device 18 and use the columns in sequence. In this manner, the discharge gas can be continuously processed.

After PFC gas is concentrated in this manner, the gas is supplied to a chromatographic separator 20. The chromatographic separator 20 includes a column filled with a desired filler. The gas is passed through the column. In this manner, the gas is separated into the constituents because the constituents have different retention times due to difference in the affinity (tendency for adsorption and distribution coefficient) of the gas constituents with respect to the filler. As a filler, for example, silica gel or molecular sieve can be used for separating $CF_4$ and $NF_3$. In the chromatographic separator 20, nitrogen is used as a carrier gas and $CF_4$ and $NF_3$ are separated by sequentially desorbing and discharging $CF_4$ and $NF_3$ adsorbed on the filler. When a fraction having both $CF_4$ and $NF_3$ is generated, it is preferable to return this fraction to the separation inlet side.

For example, while passing nitrogen gas, a predetermined amount of discharge gas can be mixed with nitrogen gas, and a fraction containing $CF_4$ and a fraction containing $NF_3$ can be separately collected.

It is also preferable to provide a plurality of columns as the chromatographic separator 20, supply the discharge gas to each column in sequence, and collect each fraction from each column in sequence.

Figure 2:
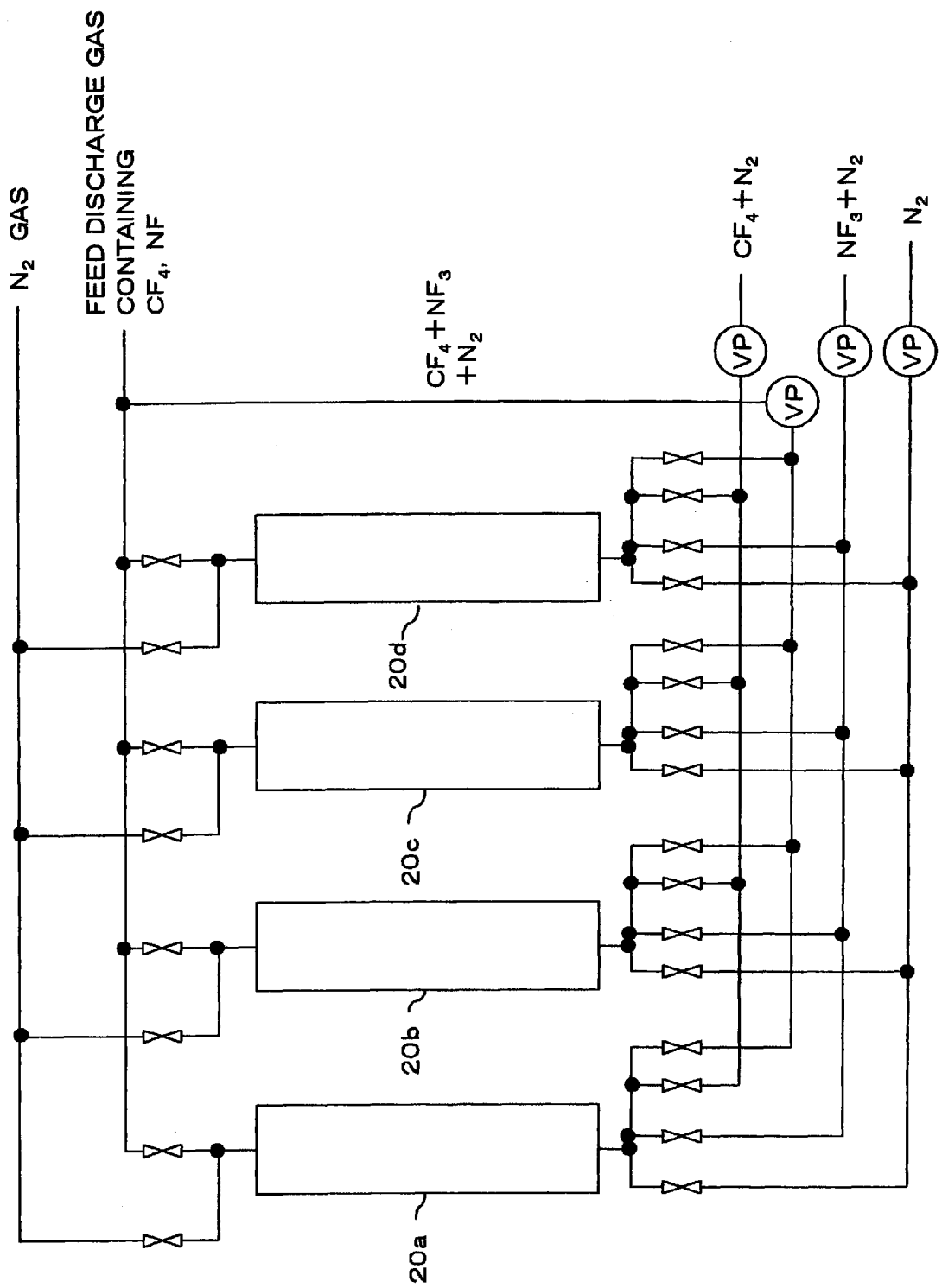
FIG. 2 is a diagram showing a structure of a chromatographic separator which uses a plurality of columns.

FIG. 2 shows a configuration example in which four columns 20a, 20b, 20c, and 20d are provided, and fractions are obtained by supplying the discharge gas to the columns in sequence. For example, nitrogen can be continuously supplied to the columns 20a, 20b, 20c, and 20d as a carrier gas, and the discharge gas can be introduced to the columns in sequence by switching the valves at the column inlet side in sequence. Because gas of nitrogen, gas of $CF_4$ and nitrogen, gas of $CF_4$, $NF_3$ and nitrogen, and gas of $NF_3$ and nitrogen flow out from each of the columns 20a, 20b, 20c, and 20d, in that order, the gases can be separated and discharged by switching valves at the column exit side in sequence and actuating corresponding one of vacuum pumps VP. The fraction containing both $CF_4$ and $NF_3$ is circulated to the column into which the discharge gas is being introduced.

In this manner, gas of nitrogen, gas of $CF_4$ and nitrogen, and gas of $NF_3$ and nitrogen are obtained at the exit of the chromatographic separator 20.

It is preferable to perform collection of the gas for each constituent at the exit of the chromatographic separator 20 and the switching of the valves in FIG. 2 based on an analysis result of the gas at the exit. For example, gas constituents can be detected using a differential thermal detector (TCD) or Fourier transform-infrared analyzer (FT-IR), and the control can be performed based on the analysis.

With this process, the gas is separated into the constituents, and thus, in the fractions of $CF_4$ and nitrogen, and of $NF_3$ and nitrogen, a pure mixture can be obtained with almost no other materials present.

The obtained gas of $CF_4$ and nitrogen is supplied to a concentrator 22 and the obtained gas of $NF_3$ and nitrogen is supplied to a concentrator 24. As the concentrators 22 and 24, it is preferable to use a membrane separator. With this structure, nitrogen is separated from the discharge gas and each of the gas constituents of the feed PFC gas ($CF_4$ or $NF_3$ in the embodiment) is concentrated. It is also possible to use a subzero cooling device as the concentrators 22 and 24. More specifically, although the boiling points for $CF_4$ and $NF_3$ are similar ($-128°$ C. and $-128.8°$ C., respectively), the boiling point of nitrogen is significantly different ($-195°$ C.). Nitrogen can thus be easily separated using this difference in the boiling points in order to concentrate the PFC gas constituents.

In particular, by circulating the concentrated gas several times in a membrane separator or by using a multiple step membrane separator, or using a subzero cooling separator, almost 100% of nitrogen can be separated, leaving a pure, 100% concentration of $CF_4$ gas and $NF_3$ gas.

The obtained $CF_4$ gas and $NF_3$ gas can then be recovered and reused at the manufacturing process 10.

In this manner, in the embodiment, the separation of $CF_4$ and $NF_3$, which is difficult in other separation methods, can be reliably achieved using the chromatographic separator 20. The separated $CF_4$ and $NF_3$ can be recovered and reused.

In particular, in the embodiment, an adsorbing device 18 is provided before the chromatographic separator 20 for concentrating PFC gas. In this manner, $CF_4$ and $NF_3$ can be reliably separated at the chromatographic separator 20 using nitrogen as a carrier gas. The concentrations of $CF_4$ and $NF_3$ in the fractions can be maintained at a certain high concentration.

Moreover, in the embodiment, for the fractions of gas of $CF_4$ and nitrogen, and gas of $NF_3$ and nitrogen, nitrogen is removed by separate concentration processors 22 and 24. Because of this, almost 100% of nitrogen can be removed, so that $CF_4$ and $NF_3$ can be reused at the manufacturing process 10.

The PFC gas includes, in addition to $CF_4$ and $NF_3$, $C_2F_4$, $SF_6$, etc. These PFC gases can be separated relatively easily by various devices. In the chromatographic separator 20, these PFC gas constituents appear as fractions that are far apart, and thus, the fraction containing these PFC gas constituents can be respectively separated from the fraction separated as nitrogen in the above example.

Also, nitrogen is discharged at the adsorbing device 18, chromatographic separator 20, and concentrators 22 and 24.

Nitrogen, on the other hand, is necessary as the diluting gas before the vacuum pump 12, as the purge gas for the adsorbing device 18, and as the carrier gas for the chromatographic separator 20. It is therefore preferable to reuse the discharged nitrogen. The decision on where the discharged nitrogen is reused can be arbitrary, but because the diluting gas before the vacuum pump 12 is close to a crude gas, it is preferable to reuse nitrogen as the diluting gas.

It is highly probable that the nitrogen gas to be reused contains some amount of the PFC gas. Therefore, it is preferable to process the nitrogen gas to remove the PFC gas. As the process, it is preferable to employ a known method for decomposing the PFC gas, such, for example, as plasma decomposition process, combustion, and catalyst heating process. It is also possible to perform the membrane process, subzero cooling separation, and chromatographic separation again for separating the PFC gas and reuse nitrogen.

Figure 3:
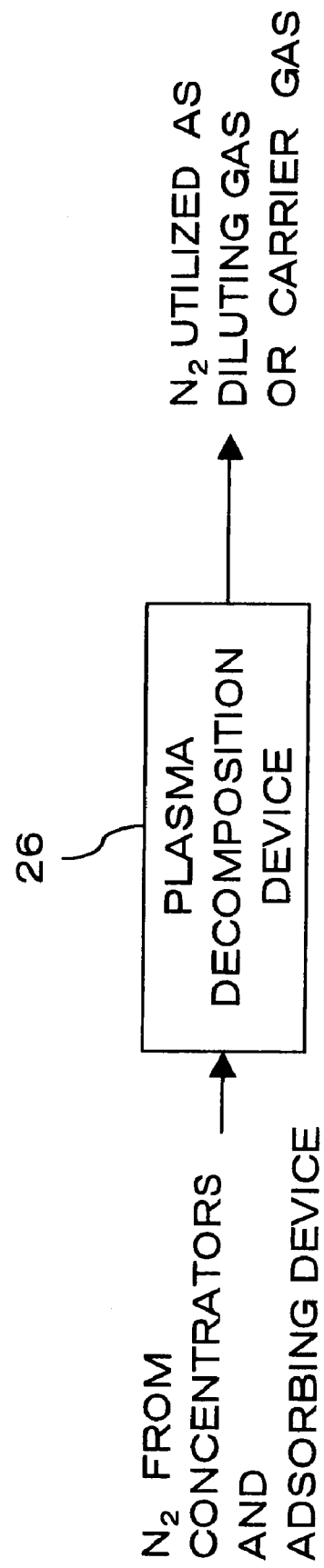
FIG. 3 is a diagram showing the processing of nitrogen.

FIG. 3 shows an example where the plasma decomposition process is employed. As shown, nitrogen discharged from the adsorbing device 18 and the concentrators 22, and 24 is subjected to the plasma decomposition process at the plasma decompose device 26 to decompose the PFC gas, and the discharged nitrogen is reused as the diluting gas, the purge gas, or the carrier gas.

EXAMPLE 1

As a sample discharge gas, nitrogen gas was prepared which contained 0.01% of $CF_4$ and 0.01% of $NF_3$ (volume percent). The sample discharge gas was introduced to the adsorbing device 18 of the apparatus shown in FIG. 1, and processing experiment was performed at each of the subsequent processes.

A column filled with an activated carbon was used as the adsorbing device 18. The sample discharge gas was passed through the column. The gas at the exit of the column was analyzed, and the supply of the discharge gas was stopped when the exiting gas started to contain $CF_4$ and $NF_3$. The adsorbed $CF_4$ and $NF_3$ were desorbed by raising the temperature in the column and supplying nitrogen as the purge gas. In this manner, nitrogen gas containing respectively 10% of $CF_4$ and $NF_3$ was obtained as the desorbed gas. Then, the obtained desorbed gas was passed through the chromatographic separator 20 with the column filled with silica gel and using nitrogen as a carrier. As a result, gas of $CF_4$ and gas of $NF_3$ were separated and discharged in that order at the column exit, due to the difference in the retention times. Respective concentrations in nitrogen was 0.01% and the purity was 100%. By removing nitrogen at the concentrators 22 and 24 (membrane separators), gases of $CF_4$ and $NF_3$ were obtained, each with almost 100% concentration.

The analysis of the nitrogen discharged at the adsorbing device 18, chromatographic separator 20, and concentrators 22 and 24 indicated that the nitrogen gas contained 10 ppm of PFC gas. The PFC gas was almost completely decomposed and rendered harmless by applying a plasma decomposition process to the obtained nitrogen. It was thus confirmed that the nitrogen gas is usable as a diluting gas before the vacuum pump 12, a purge gas at the adsorbing device 18, or as a carrier gas for the chromatographic separator 20.

What is claimed is:

1. A gas separation apparatus for separating specific gas constituents from a mixture gas containing a plurality of gas constituents, said apparatus comprising:

a gas adsorbing device for adsorbing the specific gas constituents; and a plurality of chromatographic separators operatively connected to the gas adsorbing device to receive a discharge gas from the gas adsorbing device, each of the plurality of chromatographic separators comprising at least one inlet valve and a plurality of outlet valves, the at least one inlet valve and the plurality of outlet valves arranged such that each of the specific gas constituents can be sequentially collected from the plurality of chromatographic separators by switching the plurality of outlet valves.

2. A gas separation apparatus of claim 1, further comprising:

concentrators for independently concentrating the each of the specific gas constituents and obtained at an output of the plurality of chromatographic separators; wherein the concentrated individual gas constituents obtained by said concentrators are recovered and reused.

3. A gas separation apparatus of claim 1, wherein said mixture gas having a plurality of gas constituents is PFC gas discharged from a semiconductor manufacturing process and said mixture gas contains nitrogen as another gas.

4. A gas separation apparatus of claim 3, wherein
said PFC gas contains one of fluorine compounds including at least one element of C, N, and S as a composition element.

5. A gas separation apparatus of claim 4, wherein said PFC gas includes at least one of $CF_4$, $NF_3$, $C_2F_6$, $C_3F_8$, $SF_6$, and $CHF_3$.

6. A gas separation apparatus of claim 2, wherein
each of said concentrators is a membrane separator which takes advantage of the permeability/impermeability of a membrane or a subzero cooling separator which takes advantage of the difference in the boiling points.

7. A gas separation apparatus of claim 1, wherein
said chromatographic separator includes a plurality of chromatographic columns which are used in sequence.

8. A gas separation apparatus of claim 1, wherein gas constituents other than the specific gas constituents, separated at said concentrators, said plurality of chromatographic separators and said adsorbing device contain nitrogen as the main constituent and the nitrogen gas is reused for a given usage.

9. A gas separation apparatus of claim 8, wherein
a process for removing gas constituents other than nitrogen gas is performed on said gas constituents containing nitrogen gas as the main constituent.

10. The gas separation apparatus of claim 1, further comprising a single pump for discharging the specific gas constituents from the plurality of chromatographic columns by switching.

11. The gas separation apparatus of claim 1, wherein the plurality of chromatographic separators comprise four chromatographic columns and four discharge pumps, each of the four discharge pumps is orderly connected to each of the plurality of chromatographic separators, and four types of gases are discharged from the four chromatographic separators.

* * * * *